US011351838B2

(12) United States Patent
Kim (10) Patent No.: US 11,351,838 B2
(45) Date of Patent: *Jun. 7, 2022

(54) THERMAL MANAGEMENT SYSTEM FOR VEHICLE

(71) Applicants:Hyundai Motor Company, Seoul (KR); Kia Motors Corporation, Seoul (KR)

(72) Inventor: Yeonho Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 17/091,902

(22) Filed: Nov. 6, 2020

(65) Prior Publication Data

US 2021/0309069 A1 Oct. 7, 2021

(30) Foreign Application Priority Data

Apr. 3, 2020 (KR) ........................ 10-2020-0040847

(51) Int. Cl.
*B60H 1/32* (2006.01)
*B60H 1/00* (2006.01)
*B60H 1/03* (2006.01)

(52) U.S. Cl.
CPC ..... *B60H 1/00278* (2013.01); *B60H 1/00392* (2013.01); *B60H 1/00485* (2013.01); *B60H 1/03* (2013.01); *B60H 1/3227* (2013.01); *B60H 2001/00307* (2013.01)

(58) Field of Classification Search
CPC ............ B60H 1/00278; B60H 1/00392; B60H 1/00485; B60H 1/03; B60H 1/3227; B60H 2001/00307
USPC .......................................................... 62/239
See application file for complete search history.

(56) References Cited

U.S. PATENT DOCUMENTS

| 8,215,432 B2 | 7/2012 | Nemesh et al. |
| 8,336,319 B2 | 12/2012 | Johnston et al. |
| 2013/0283838 A1 | 10/2013 | Kadle et al. |
| 2022/0032736 A1* | 2/2022 | Kim .................. B60H 1/00278 |

FOREIGN PATENT DOCUMENTS

JP 5336033 B2 11/2013

* cited by examiner

*Primary Examiner* — Davis D Hwu
(74) *Attorney, Agent, or Firm* — Morgan, Lewis & Bockius LLP (57) ABSTRACT

A thermal management system for a vehicle may include a cooling apparatus configured to include a radiator, a first water pump, a first valve, and a reservoir tank to circulate a coolant in the coolant line to cool at least one electrical component provided in the coolant line; a battery cooling apparatus including a battery coolant line connected to the coolant line through a second valve, and a second water pump and a battery module which are connected through the battery coolant line; a chiller provided in the battery coolant line between the second valve and the battery module, and connected to a refrigerant line of an air conditioner; and a heating circuit including a heater which is connected to the coolant line and the chiller through first and second connection lines to supply a coolant having a temperature which is increased while passing through the at least one electrical component.

20 Claims, 7 Drawing Sheets

THERMAL MANAGEMENT SYSTEM FOR VEHICLE

CROSS-REFERENCE TO RELATED APPLICATION

The present application claims priority to Korean Patent Application No. 10-2020-0040847, filed on Apr. 3, 2020, the entire contents of which is incorporated herein for all purposes by this reference.

BACKGROUND OF THE INVENTION

Field of the Invention

The present invention relates to a vehicle thermal management system, and more particularly, to a vehicle thermal management system which adjusts a temperature of a battery module by use of one chiller that performs heat exchange between a refrigerant and a coolant and improves heating efficiency by use of waste heat generated from an electrical component.

Description of Related Art

In recent years, an electric vehicle has become popular as a future transporting means, as environment and energy resources are becoming important issues. The electric vehicle utilizes a battery module in which a plurality of rechargeable cells are formed as one pack as a main power source, and thus no exhaust gas is generated and noise is very low.

Such an electric vehicle is driven by a drive motor which operates through electric power supplied from the battery module. Furthermore, the electric vehicle includes electrical components for controlling and managing the drive motor as well as a plurality of electronic convenience devices and for charging the battery module.

On the other hand, since a large amount of heat is generated in the battery and the electrical components as well as the drive motor used as a primary power source of the electric vehicle, efficient cooling is required, so efficient temperature management of the electrical components and the battery module may be a very important problem to overcome.

Conventionally, separate cooling systems are applied to adjust the temperature of the electrical components and the battery module, but it is necessary to increase capacity of the cooling system according thereto, which leads to space restrictions. Furthermore, when the capacity of the cooling systems is increased, power required for operating the cooling systems is also increased.

Accordingly, it is required to develop technologies for efficiently using the waste heat generated from the electrical components, as well as adjusting the temperature of the electrical components and the battery to maximize energy efficiency while securing durability of the electrical components and the battery module in the electric vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle thermal management system which adjusts a temperature of a battery module by use of one chiller that performs heat exchange between a refrigerant and a coolant and improves heating efficiency by use of waste heat generated from an electrical component.

Various aspects of the present invention are directed to providing a vehicle thermal management system, including: a cooling apparatus configured to include a radiator, a first water pump, a first valve, and a reservoir tank which are connected through a coolant line, and to circulate a coolant in the coolant line to cool at least one electrical component provided in the coolant line; a battery cooling apparatus configured to include a battery coolant line connected to the coolant line through a second valve, and a second water pump and a battery module which are connected through the battery coolant line to circulate the coolant in the battery module; a chiller provided in the battery coolant line between the second valve and the battery module, and connected to a refrigerant line of an air conditioner through a refrigerant connection line, to adjust a temperature of the coolant by heat-exchanging the coolant supplied to the battery coolant line with a refrigerant selectively supplied from the air conditioner through the refrigerant connection line; and a heating circuit configured to include a heater which is connected to the coolant line and the chiller through first and second connection lines to supply a coolant having a temperature which is increased while passing through the at least one electrical component, wherein the reservoir tank is provided in the coolant line between the radiator and the second valve, and is connected to the coolant line connecting the second valve and the first water pump through a supply line.

A first end portion of the first connection line may be connected to the coolant line through the first valve, and a second end portion of the first connection line may be connected to the heater. A first end portion of the second connection line may be connected to the heater, and a second end portion of the second connection line is connected to the chiller. The heater may be provided inside a heating, ventilation, and air conditioning (HVAC) module included in the air conditioner.

The battery cooling apparatus may further include a first coolant heater provided in the battery coolant line between the battery module and the chiller.

When the battery module is heated, the battery coolant line may be closed in connection with the coolant line by operating the second valve, the coolant may be circulated along the battery coolant line by operating the second water pump, and the first coolant heater may be operated to heat a coolant supplied to the battery module along the battery coolant line.

The air conditioner may include: an HVAC module configured to include an evaporator which is connected thereto through the refrigerant line and a door configured to control outside air passing through the evaporator to be selectively introduced into the heater depending on cooling, heating, and heating/dehumidifying modes of the vehicle therein; a condenser connected to the coolant line to circulate a coolant therein to perform heat exchange between the coolant and a refrigerant supplied through the refrigerant line connected to the condenser; a compressor connected between the evaporator and the condenser through the refrigerant line; a sub-condenser provided in the refrigerant line between the condenser and the evaporator; a first expansion valve provided in the refrigerant line between the sub-condenser and the evaporator; and a second expansion valve provided in the refrigerant connection line.

A first end portion of the refrigerant connection line may be connected to the refrigerant line between the sub-condenser and the first expansion valve, and a second end portion of the refrigerant connection line may be connected to the refrigerant line between the evaporator and the compressor.

Each of the chiller and the condenser may be a water-cooled heat exchanger, and the sub-condenser may be an air-cooled heat exchanger.

The HVAC module may further include an air heater provided between the heater and the evaporator to selectively heat outside air flowing into the heater.

The air heater may be operated to raise a temperature of the outside air flowing into the heater when a temperature of a coolant supplied to the heater is lower than a target temperature for internal heating.

When the battery module is cooled by use of the refrigerant, in the cooling apparatus, the coolant may be circulated in the coolant line by operating the first water pump, the supply line may be opened, the first connection line may be closed through operation of the first valve, and the second connection line may be closed, and in the battery cooling apparatus, the coolant may be circulated in the battery coolant line by operating the second water pump, and each of the cooling apparatus and the battery cooling apparatus may form an independent closed and sealed circuit in which the coolant is circulated by operating the second valve, while in the air conditioner, the refrigerant connection line may be opened through operation of the second expansion valve, and the second expansion valve may expand the refrigerant supplied to the refrigerant connection line and may supply the expanded refrigerant to the chiller.

When waste heat is recovered from the electrical component in the vehicle heating and dehumidifying mode, the first connection line may be opened through operation of the first valve, and the second connection line may be opened, and in the cooling apparatus, a portion of the coolant line connected to the radiator and a portion of the coolant line connecting the radiator and the reservoir tank are closed based on the first connection line, a battery coolant line other than a portion of the battery coolant line connected to the chiller is closed through operation of the second valve, the coolant having a temperature that has risen through the at least one electrical component by operating the first water pump is supplied to the heater along the first connection line without passing through the radiator, the coolant exhausted from the heater flows into the chiller along the second connection line, and flows into the electrical component through the battery coolant line and the coolant line which are opened by operating the second valve, and a part of the coolant stored in the reservoir tank may be circulated along the opened coolant line through the opened supply line, while in the air conditioner, the refrigerant connection line may be closed by operating of the second expansion valve, and the refrigerant may be circulated along the refrigerant line by operating the compressor.

When the electrical component and the battery module are cooled by use of a coolant cooled in the radiator, the first and second connection lines may be closed through operation of the first valve, the battery coolant line may be connected to the coolant line by operating the second valve, the coolant cooled by the radiator and stored in the reservoir tank may be supplied to the battery module while circulating along the battery coolant line by operating the second valve and the second water pump, the coolant circulating through the battery cooling apparatus may be supplied to the electrical component while circulating along the coolant line by operating the first water pump, and a part of the coolant stored in the reservoir tank may be circulated along the coolant line through the opened supply line.

When waste heat is recovered from the electrical component in a vehicle dehumidifying mode, the first connection line may be opened through operation of the first valve, and the second connection line may be opened, in the cooling apparatus, a portion of the coolant line connected to the radiator and a portion of the coolant line connecting the radiator and the reservoir tank may be closed based on the first connection line, the battery coolant line other than a portion of the battery coolant line connected to the chiller may be closed through operation of the second valve, the coolant having a temperature that has risen through the at least one electrical component by operating the first water pump may be supplied to the heater along the first connection line without passing through the radiator, the coolant exhausted from the heater may flow into the chiller along the second connection line, and may flow into the electrical component through the battery coolant line and the coolant line which are opened by operating the second valve, and a part of the coolant stored in the reservoir tank may be circulated along the opened coolant line through the opened supply line.

The first valve may open the coolant line connected to the radiator to allow a part of the coolant passing through the at least one electrical component to flow into the first connection line and the remaining part of the coolant to flow into the radiator when the electrical component is overheated.

The first valve may be a three-way valve configured for distributing a flow rate, and the second valve may be a four-way valve.

The electrode component may include an electric power control unit (EPCU), a motor, an inverter, or an on board charger (OBC).

The supply line may be connected to the coolant line when the coolant is circulated to the coolant line by operating the first water pump.

The heating circuit may further include a second coolant heater provided in the first connection line.

The second coolant heater may be operated to raise a temperature of the outside air flowing into the heater when a temperature of a coolant supplied to the heater through the first connection line is lower than a target temperature for internal heating.

A described above, according to the vehicle thermal management system according to the exemplary embodiment of the present invention, the temperature of the battery module may be adjusted depending on the mode of the vehicle by use of one chiller for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component and using it for internal heating.

Furthermore, according to various exemplary embodiments of the present invention, it is possible to optimize the performance of the battery module by efficiently controlling the temperature of the battery module, and to increase an overall travel distance of the vehicle through efficient management of the battery module.

Furthermore, the entire system may be simplified to reduce manufacturing cost and weight, and to improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Since the exemplary embodiments described in the specification and the configurations shown in the drawings are merely the most preferable exemplary embodiments and configurations of the present invention, they do not represent all of the technical ideas of the present invention, and it may be understood that various equivalents and modified examples, which may replace the exemplary embodiments of the present invention, are possible, when filing the present application.

To clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and to clearly illustrate several portions and areas, enlarged thicknesses are shown.

Furthermore, throughout the specification unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 1:
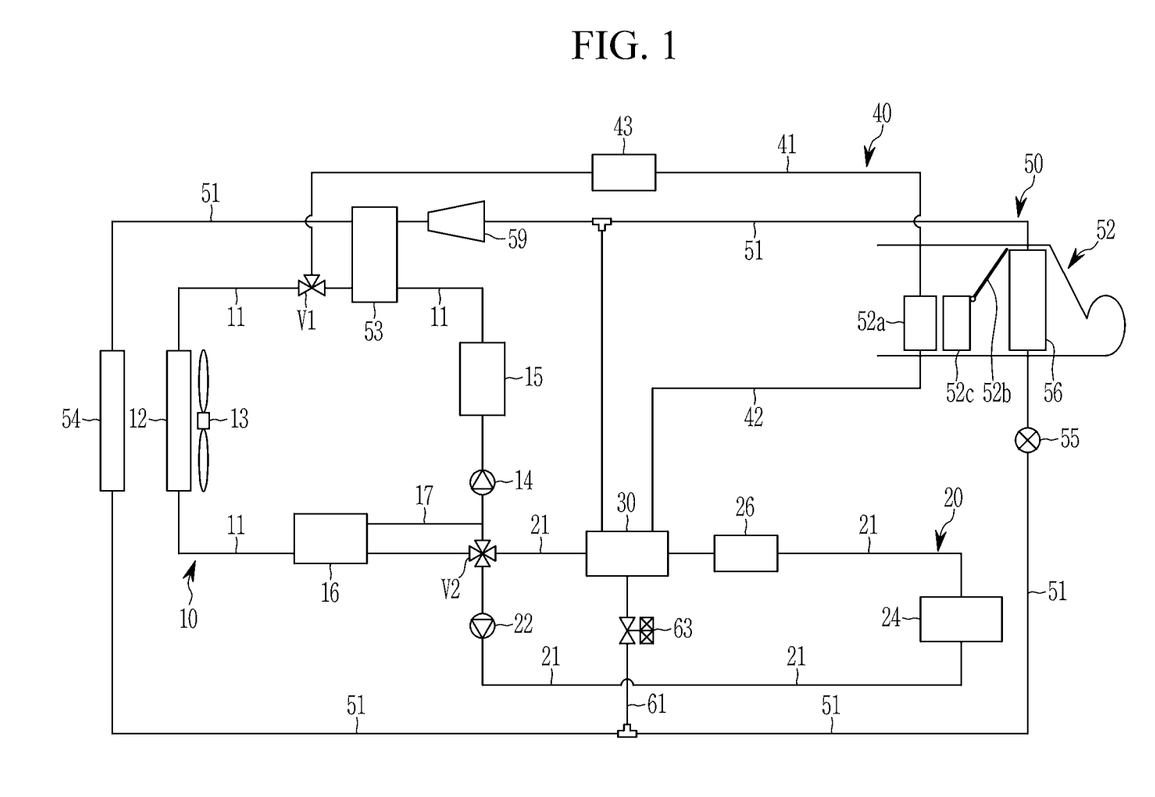
FIG. 1 illustrates a block diagram of a vehicle thermal management system according to various exemplary embodiments of the present invention.

FIG. 1 illustrates a block diagram of a vehicle thermal management system according to various exemplary embodiments of the present invention.

According to the exemplary embodiment of the present invention, the vehicle thermal management system may adjust a temperature of a battery module 24 by use of one chiller 30 for performing heat exchange between a refrigerant and a coolant, and may recover waste heat generated from an electrical component 15 to use it for internal heating.

Such a thermal management system may be applied to electric vehicles.

Referring to FIG. 1, the thermal management system may include a cooling apparatus 10, a battery cooling apparatus 20, a chiller 30, and a heating circuit 40.

First, the cooling apparatus 10 includes a radiator 12 connected to a coolant line 11, a first water pump 14, a first valve V1, and a reservoir tank 16.

The radiator 12 is mounted in the front of the vehicle, and a cooling fan 13 is mounted behind the radiator 12, so that the coolant is cooled through an operation of the cooling fan 13 and heat exchange with the outside air.

Furthermore, the electrical component 15 may include an electric power control unit (EPCU), a motor, an inverter, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the motor, the inverter, or the OBC may be recovered.

This cooling apparatus 10 may circulate the coolant in the coolant line 11 such that the coolant is supplied to the electrical component 15 provided in the coolant line 11.

The battery cooling apparatus 20 includes a battery coolant line 21 connected to the coolant line 11 through a second valve V2 and a second water pump 22 connected to the battery coolant line 21, and the battery module 24.

The battery cooling apparatus 20 may selectively circulate the coolant in the battery module 24 through an operation of the second water pump 22.

Herein, the first water pump 14 and the second water pump 22 may each be an electric water pump.

Meanwhile, the battery cooling apparatus 20 may further include a first coolant heater 26 provided in the battery coolant line 21 between the battery module 24 and the second valve V2.

When the temperature of the coolant supplied to the battery module 24 is lower than a target temperature, the first coolant heater 26 may be activated to heat the coolant circulated in the battery coolant line 21.

Accordingly, the coolant having a temperature which is increased while passing through the first coolant heater 26 may be supplied to the battery module 24, to raise the temperature of the battery module 24.

That is, the first coolant heater 26 may selectively operate when the temperature of the battery module 24 is raised.

In the exemplary embodiment of the present invention, the chiller 30 is provided in the battery coolant line 21 between the second valve V2 and the battery module 24.

The chiller 30 is connected to a refrigerant line 51 of an air conditioner 50 through a refrigerant connection line 61. That is, the chiller 30 may be a water-cooled heat exchanger into which a coolant flows.

Accordingly, the chiller 30 may regulate the temperature of the coolant by performing heat exchange between the coolant which is selectively supplied to the battery coolant line 21 and the refrigerant which is selectively supplied from the air conditioner 50.

Herein, the reservoir tank 16 is provided in the coolant line 11 between the radiator 12 and the second valve V2.

The reservoir tank 16 may be connected to the second valve V2 through the coolant line 11 and a supply line 17 connecting the second valve V2 and the first water pump 14.

When the coolant is circulated to the coolant line 11 by operation of the first water pump 14, the supply line 17 may be connected to the coolant line 11.

That is, when the first water pump 14 is operated, the reservoir tank 16 may always allow some of the stored coolant to flow into the coolant line 11 through the supply line 17.

Accordingly, when the first water pump 14 is operated, occurrence of cavitation in the first water pump 14 may be prevented. Furthermore, damage to the first water pump 14 due to the cavitation may be prevented in advance.

The heating circuit 40 includes a heater 52a which is connected to the coolant line 11 and to the chiller 30 through first and second connection lines 41 and 42 to supply the coolant having the temperature which is increased while it passes through the electrical component 15.

Herein, a first end portion of the first connection line 41 may be connected to the coolant line 11 through the first valve V1, and a second end portion of the first connection line 41 may be connected to the heater 52a.

A first end portion of the second connection line 42 may be connected to the heater 52a, and a second end portion of the second connection line 42 may be connected to the chiller 30.

Furthermore, the heater 52a may be provided inside a heating, ventilation, and air conditioning (HVAC) module 52 included in the air conditioner 50.

Accordingly, when an interior of the vehicle is heated, the heating circuit 40 may supply the high temperature coolant to the heater 52a through the first connection line 41 and the second connection line 42 which are opened by operating the first valve V1.

Herein, the heating circuit 40 may further include a second coolant heater 43 provided in the first connection line 41 between the first valve V1 and the heater 52a.

The second coolant heater 43 may increase a temperature of the coolant by selectively heating the coolant circulating along the first connection line 41.

That is, when the temperature of the coolant supplied to the heater 52a in the vehicle heating mode is lower than the target temperature, the second coolant heater 43 may be turned on to heat the coolant circulated in the first connection line 41, allowing a coolant having an increased temperature to flow into the heater 52a.

This second coolant heater 43 may be an electric heater that operates depending on power supply.

Meanwhile, in the exemplary embodiment of the present invention, the second coolant heater 43 is provided in the first connection line 41 as various exemplary embodiments of the present invention, but the present invention is not limited thereto, and an air heater 52c for increasing a temperature of the outside air introduced into the interior of the vehicle may be applied instead of the second coolant heater 43.

The air heater 52c may be operated to raise the temperature of the outside air flowing into the heater 52a when the temperature of the coolant supplied to the heater 52a is lower than a target temperature for internal heating.

The air heater 52c may be mounted in front of the heater 52a inside the HVAC module 52 toward the interior of the vehicle to selectively heat outside air supplied to the heater 52a.

That is, one of the second coolant heater 43 and the air heater 52c may be applied as the heating circuit 40.

In the exemplary embodiment of the present invention, the air conditioner 50 includes the HVAC module 52, a condenser 53, a sub-condenser 54, a first expansion valve 55, an evaporator 56, and a compressor 59 which are connected through the refrigerant line 51.

First, the HVAC module 52 includes the evaporator 56 connected therewith through the refrigerant line 51, and a door 52b for controlling the outside air passing through the evaporator 56 to be selectively introduced into the heater 52a depending on cooling, heating, and heating/dehumidifying modes of the vehicle therein.

That is, the opening and closing door 52b is opened to allow the outside air passing through the evaporator 56 to be introduced into the heater 52a in the heating mode of the vehicle. In contrast, in the cooling mode of the vehicle, the opening and closing door 52b closes off the heater 52a such that the outside air which is cooled while passing through the evaporator 56 directly flows into the vehicle.

Herein, the HVAC module 52 may further include the air heater 52c provided between the heater 52a and the evaporator 56 to selectively heat the outside air supplied to the heater 52a.

The air heater 52c may be operated to raise the temperature of the outside air flowing into the heater 52a when the temperature of the coolant supplied to the heater 52a is lower than a target temperature for internal heating.

In the exemplary embodiment of the present invention, the condenser 53 is connected to the refrigerant line 51 to allow the refrigerant to pass therethrough, and is connected to the coolant line 11 to allow the coolant circulating in the cooling apparatus 10 to pass therethrough.

This condenser 53 may condense the refrigerant through heat exchange with the coolant supplied through the coolant line 11. That is, the condenser 53 may be a water-cooled heat exchanger into which a coolant flows.

The condenser 53 configured as described above may perform heat exchange between the refrigerant supplied from the compressor 59 and the coolant supplied from the cooling apparatus 10 to condense the refrigerant.

In the exemplary embodiment of the present invention, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is disposed in front of the radiator 12 to exchange heat between the refrigerant flowing into sub-condenser 54 and the outside air.

As a result, the sub-condenser 54 may be an air-cooled heat exchanger for condensing the refrigerant by use of outside air.

Accordingly, the sub-condenser 54 may further condense the refrigerant which is condensed in the condenser 53 to increase subcooling of the coolant, improving a coefficient of performance (COP), which is a coefficient of the cooling capacity relative to the power required by the compressor.

The first expansion valve 55 is provided in the refrigerant line 51 between the sub-condenser 54 and the evaporator 56. The first expansion valve 55 receives the refrigerant passing through the sub-condenser 54 to expand it.

In the exemplary embodiment of the present invention, a first end portion of the refrigerant connection line 61 is connected to the refrigerant line 51 between the sub-condenser 54 and the first expansion valve 55. A second end portion of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 30 when the battery module 24 is cooled by the coolant heat-exchanged with the refrigerant.

That is, the second expansion valve 63 is operated to expand the refrigerant when the battery module 24 is cooled by use of the coolant heat-exchanged with the refrigerant.

This second expansion valve 63 may introduce the refrigerant exhausted from the sub-condenser 54 into the chiller 30 in a state where the temperature of the refrigerant is reduced by expanding the refrigerant, to further reduce the temperature of the coolant passing through the interior of the chiller 30.

As a result, the coolant having the temperature which is reduced while passing through the chiller 30 is introduced into the battery module 24, being more efficiently cooled.

The compressor 59 is connected thereto between the evaporator 56 and the condenser 53 through the refrigerant line 51. This compressor 59 may compress the gaseous refrigerant and supply the compressed refrigerant to the condenser 53.

Herein, the first and second expansion valves 55 and 63 may be electronic expansion valves that selectively expand the coolant while controlling a flow of the refrigerant through the coolant line 51 or the refrigerant connection line 61.

Furthermore, the first valve V1 may be a three-way valve configured for distributing a flow rate, and the second valve V2 may be a four-way valve.

Hereinafter, an operation and function of the vehicle thermal management system according to the exemplary embodiment of the present invention configured as described above will be described in detail with reference to FIG. 2 to FIG. 7.

First, an operation of a case of cooling the electrical component 15 and the battery module 24 using the radiator 12 in the vehicle thermal management system according to the exemplary embodiment of the present invention will be described with reference to FIG. 2.

Figure 2:
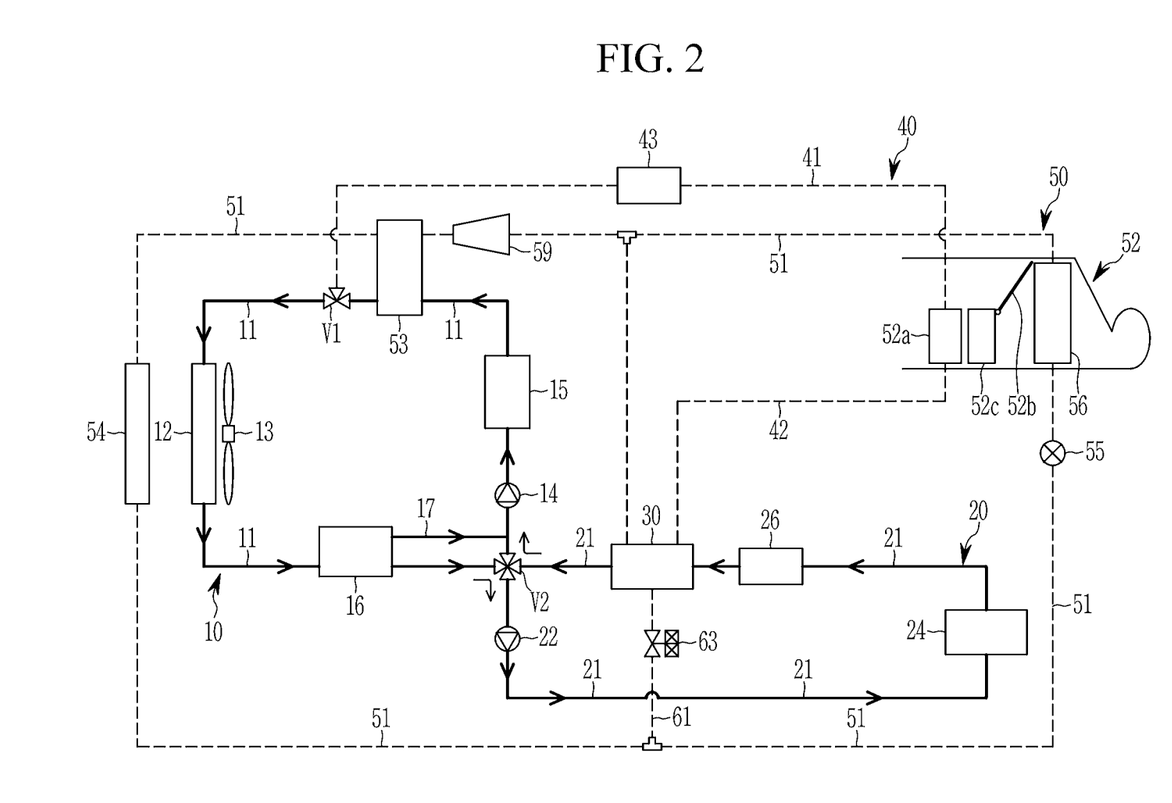
FIG. 2 illustrates an operational state diagram for cooling electrical components and a battery module by use of a radiator in a vehicle thermal management system according to various exemplary embodiments of the present invention.

FIG. 2 illustrates an operational state diagram for cooling electrical components and a battery module by use of a radiator in a vehicle thermal management system according to various exemplary embodiments of the present invention.

Referring to FIG. 2, the first and second connection lines 41 and 42 are closed through operation of the first valve V1.

Furthermore, the battery coolant line 21 is connected to the coolant line 11 by the operation of the second valve V2.

In the present state, in the cooling apparatus 10, the first water pump 14 is operated to cool the electrical component 15.

In the present state, in the battery cooling apparatus 20, the second water pump 22 is operated to cool the battery module 24.

Accordingly, the coolant cooled by the radiator 12 and stored in the reservoir tank 16 is circulated to the battery coolant line 21 by operating the second valve V2 and the second water pump 22, and is supplied to the battery module 24.

The coolant circulating through the battery cooling apparatus 20 may be supplied to the electrical component 15 while circulating along the coolant line 11 by operating the first water pump 14.

Herein, a part of the coolant stored in the reservoir tank 16 may be circulated along the coolant line 11 through the opened supply line 17.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The air conditioner 50 is not operated because the cooling mode of the vehicle is not activated.

On the other hand, although it has been described in the exemplary embodiment of the present invention that both of the electrical component 15 and the battery module 24 are cooled, the present invention is not limited thereto, and when one of the electrical component 15 and the battery module 24 is separately cooled, the first and second water pumps 14 and 22 may be selectively operated.

In the exemplary embodiment of the present invention, an operation for cooling the battery module 24 by use of a refrigerant will be described with reference to FIG. 3.

Figure 3:
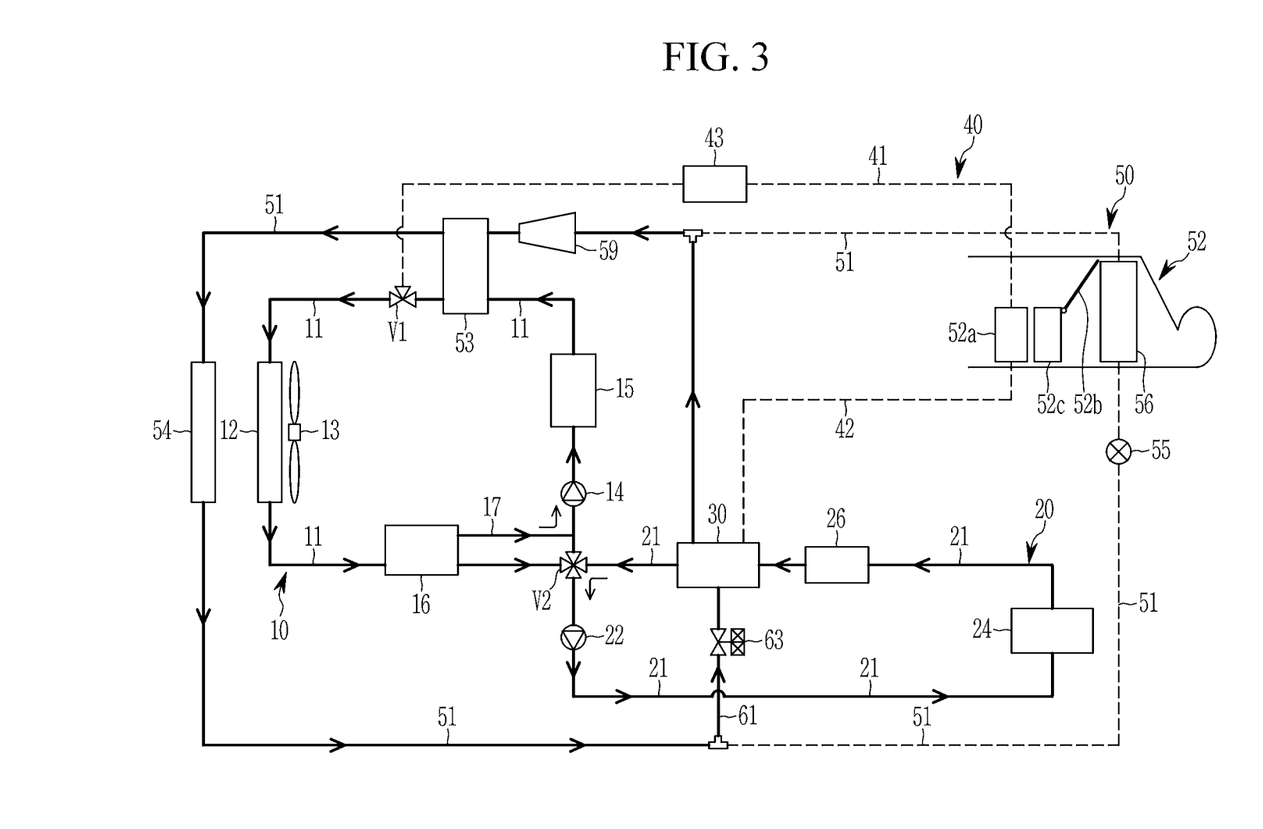
FIG. 3 illustrates an operational state diagram for cooling a battery module by use of a refrigerant in a vehicle thermal management system according to various exemplary embodiments of the present invention.

FIG. 3 illustrate an operational state diagram for cooling electrical components and a battery module by use of a radiator in a vehicle thermal management system according to various exemplary embodiments of the present invention.

Referring to FIG. 3, the first connection line 41 is closed by operating the first valve V1, and the second connection line 42 is closed.

In the present state, in the cooling apparatus 10, the first water pump 14 is operated to cool the electrical component 15.

In the present state, in the battery cooling apparatus 20, the second water pump 22 is operated to cool the battery module 24.

Herein, the cooling apparatus 10 and the battery cooling apparatus 20 may form an independently closed and sealed circuit in which the coolant is circulated by operating the second valve V2.

That is, in the battery cooling apparatus 20, the connection with the coolant line 11 is closed by operating the second valve V2. In the instant state, the battery cooling apparatus 20 may form a closed and sealed circuit in which the coolant is independently circulated in the battery coolant line 21 by operating the second water pump 22.

In the air conditioner 50, each constituent element except for the evaporator 56 operates to supply the refrigerant to the chiller 30.

Herein, the refrigerant line 51 connecting the sub-condenser 54 and the evaporator 56 is closed by operating the first expansion valve 55.

The refrigerant connection line 61 is opened through operation of the second expansion valve 63.

Accordingly, the refrigerant passing through the sub-condenser 54 may be circulated along the refrigerant line 51 and the refrigerant connection line 61.

Herein, the second expansion valve 63 may expand the refrigerant supplied to the refrigerant connection line 61 to supply the refrigerant to the chiller 30.

Herein, the coolant passing through the chiller 30 circulates in the battery coolant line 21 to cool the battery module 24 through operation of the second water pump 22.

The coolant passing through the chiller 30 is cooled through heat exchange with the expanded refrigerant which is supplied to the chiller 30. The coolant cooled in the chiller 30 is supplied to the battery module 24. Accordingly, the battery module 24 is cooled by the cooled coolant.

That is, the second expansion valve 63 expands the refrigerant passing through the sub-condenser 54 to supply the expanded refrigerant to the chiller 30, and opens the refrigerant connection line 61.

Accordingly, the refrigerant discharged from the sub-condenser 54 is expanded to enter a low-temperature and low-pressure state through operation of the second expansion valve 63, and flows into the chiller 30 connected to the first connection line 61.

Thereafter, the refrigerant flowing into the chiller 30 performs heat exchange with the coolant and flows into the compressor 59 through the first connection line 61.

The compressor 59 compresses the refrigerant and supplies it to the condenser 53.

The condenser 53 condenses the refrigerant by use of the coolant flowing along the coolant line 11. The sub-condenser 54 may further condense the refrigerant introduced from the condenser 53 through heat exchange with the outside air.

Accordingly, the coolant having the temperature which is raised while cooling the battery module 24 is cooled through the heat exchange with the low-temperature and low-pressure refrigerant inside the chiller 30. The cooled coolant is supplied back to battery module 24 through the battery coolant line 21.

As a result, the coolant may efficiently cool the battery module 24 while repeating the above-described operation.

On the other hand, when cooling of the vehicle interior is required in a state in which the battery module 24 is cooled using the refrigerant, the refrigerant line 51 connecting the sub-condenser 54 and the evaporator 56 may be opened by the operation of the first expansion valve 55.

That is, the first expansion valve 55 may selectively open or close the refrigerant line 51 connecting the sub-condenser 54 and the evaporator 56 depending on whether or not cooling is required in the vehicle interior.

Hereinafter, an operation of the cooling mode of the vehicle will be described with reference to FIG. 4.

Figure 4:
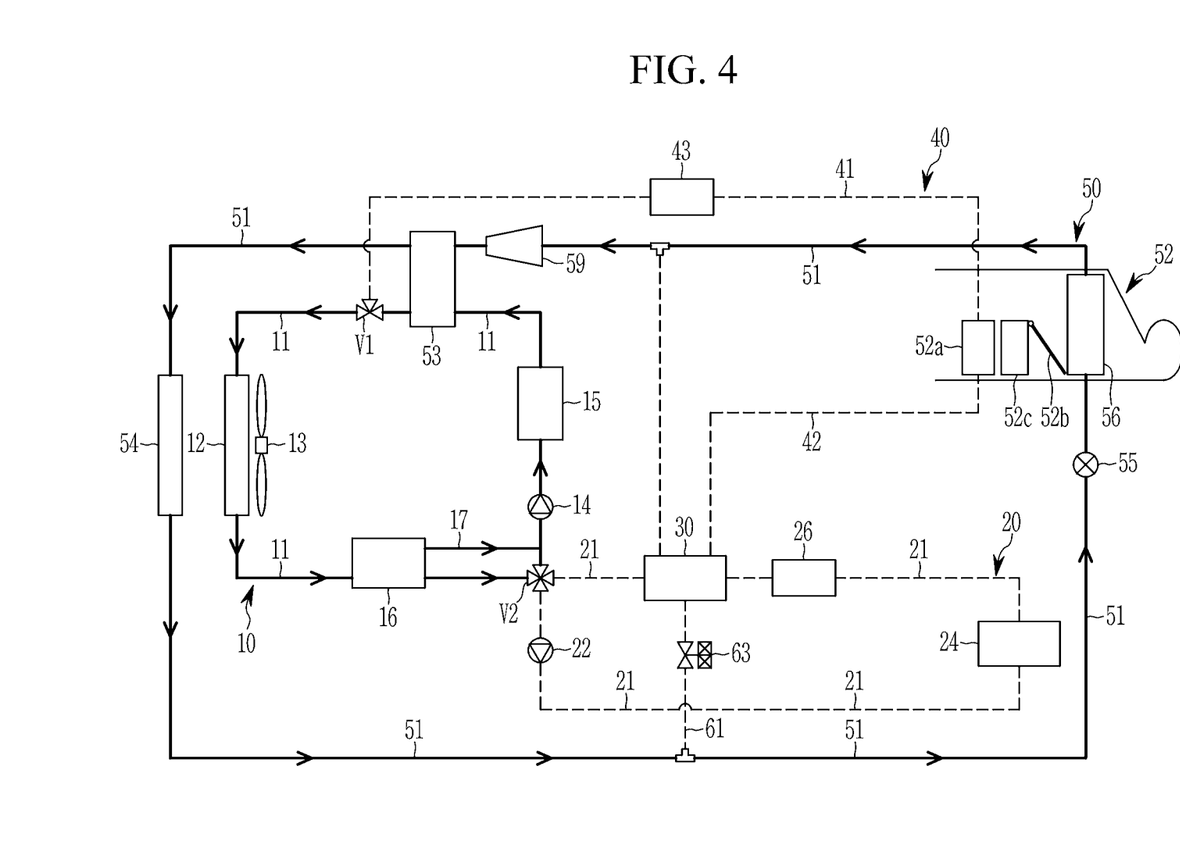
FIG. 4 illustrates an operational state diagram for a cooling mode of a vehicle in a vehicle thermal management system according to various exemplary embodiments of the present invention.

FIG. 4 illustrates an operational state diagram for cooling electrical components and a battery module by use of a radiator in a vehicle thermal management system according to various exemplary embodiments of the present invention.

Referring to FIG. 4, in the cooling apparatus 10, the coolant is circulated in the coolant line 11 through operation of the first water pump 14.

Herein, the first connection line 41 is closed by operating the first valve V1, and the second connection line 42 is closed.

Accordingly, the coolant cooled in the radiator 12 may be supplied to the condenser 53 through operation of the first water pump 14.

Furthermore, in the battery cooling apparatus 20, the coolant line 11 and the battery coolant line 21 are not connected by operating the second valve V2. Furthermore, an operation of the second water pump 22 is stopped.

That is, the cooling apparatus 10 forms a closed and sealed circuit in which the coolant is independently circulated along the coolant line 21 when connection between the coolant line 11 and the battery coolant line 21 is closed by operating the second valve V2.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is closed by operating the first expansion valve 55. The refrigerant connection line 61 is closed through operation of the second expansion valve 63.

Accordingly, the refrigerant passing through the sub-condenser 54 may be circulated along the refrigerant line 51.

Herein, the first expansion valve 55 may expand the refrigerant such that the expanded refrigerant is supplied to the evaporator 56.

The condenser 53 condenses the refrigerant by use of the coolant flowing along the coolant line 11. The sub-condenser 54 may further condense the refrigerant introduced from the condenser 53 through heat exchange with the outside air.

The refrigerant discharged from the sub-condenser 54 flows through the refrigerant line 51 to cool the vehicle interior, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In the instant case, a portion of the heater 52a through which the cooled outside air passes is closed by the opening and closing door 52b such that the outside air does not pass through the heater 52a. Accordingly, the cooled outside air directly flows into the interior of the vehicle, cooling the vehicle interior.

On the other hand, the coolant having an amount of condensation which is increased while sequentially passing through the condenser 53 and the sub-condenser 54 may be expanded and supplied to the evaporator 56, allowing the refrigerant to be evaporated to a lower temperature.

As a result, in the exemplary embodiment of the present invention, the condenser 53 condenses the refrigerant, and the sub-condenser 54 further condenses the refrigerant, which is advantageous in performing subcooling of the refrigerant.

Furthermore, the subcooled refrigerant may be evaporated to a lower temperature in the evaporator 56, improving cooling performance and efficiency.

The refrigerant may cool the interior of the vehicle in the cooling mode of the vehicle while repeating the above-described processes.

In the exemplary embodiment of the present invention, an operation in a case of recovering the waste heat of the electrical component 15 in the heating mode of the vehicle will be described with reference to FIG. 5.

Figure 5:
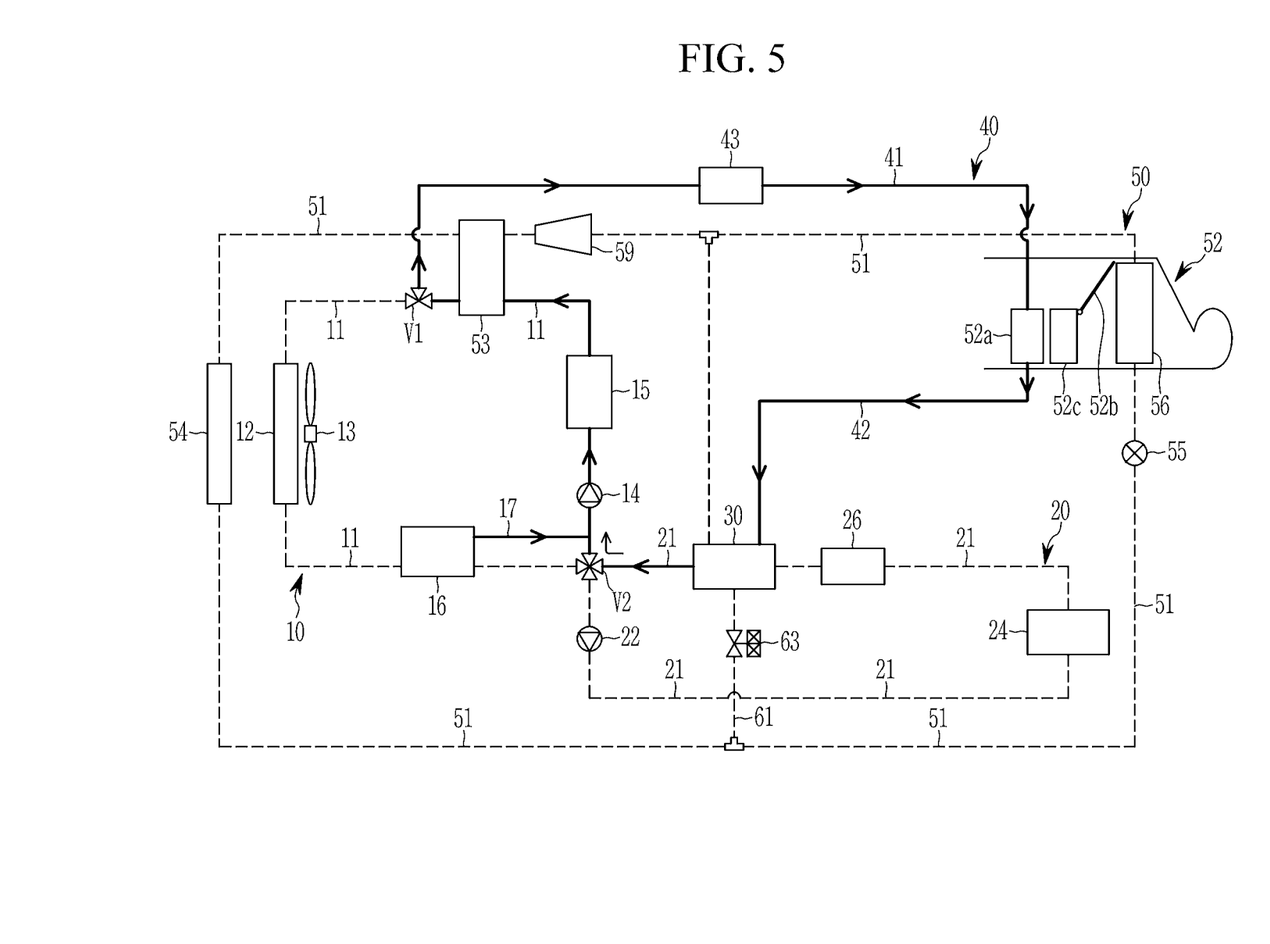
FIG. 5 illustrates an operational state diagram for recovery of waste heat of electrical components in a heating mode of a vehicle in a vehicle thermal management system according to various exemplary embodiments of the present invention.

FIG. 5 illustrates an operational state diagram for recovery of waste heat of electrical components in a heating mode of a vehicle in a vehicle thermal management system according to various exemplary embodiments of the present invention.

Referring to FIG. 5, the heat management system may recover the waste heat of the electrical component 15 and use it for heating the interior of the vehicle.

First, in the cooling apparatus 10, the first water pump 14 is operated for circulation of the coolant. In the instant case, the air conditioner 50 is stopped.

Herein, the first connection line 41 is opened through operation of the first valve V1. At the same time, the second connection line 42 is opened.

Furthermore, on the basis of the first connection line 41, a portion of the coolant line 11 connected to the radiator 12 and a portion of the coolant line 11 connecting the radiator 12 and the reservoir tank 16 are closed.

Herein, the battery coolant line 21 is closed through operation of the second valve V2 except for the battery coolant line 21 connected to the chiller 30.

That is, the battery coolant line 21 connecting the second water pump 22, the battery module 24, and the first coolant heater 26 is closed, and the battery cooling apparatus 20 is deactivated.

Furthermore, a part of the coolant stored in the reservoir tank 16 may be circulated along the coolant line 11 through the open supply line 17.

In the present state, the coolant having the temperature that has risen through the electrical component 15 by the operation of the first water pump 14 is supplied to the heater 52a along the first connection line 41 without passing through the radiator 12.

The coolant discharged from the heater 52a flows into the chiller 30 along the second connection line 42, and is introduced into the electrical component 15 through the battery coolant line 21 and the coolant line 11 which are opened by operating the second valve V2.

That is, the coolant that has passed through the electrical component 15 continues to circulate along the coolant line 11, the first and second connection lines 41 and 42, and a portion of the battery coolant line 21 without passing through the radiator 12, and absorbs the waste heat from the electrical component 15, so that the temperature thereof increases.

The coolant having the temperature that has been raised is supplied to the heater 52a through the opened first connection line 41 without passing through the radiator 12.

The high-temperature coolant supplied to the heater 52a performs heat exchange with the outside air, and then is introduced into the coolant line 11 through the second connection line 42 and the chiller 30 and a portion of the battery coolant line 21 without passing through the radiator 12.

Herein, the opening and closing door 52b is opened such that the outside air flowing into the HVAC module 52 passes through the heater 52a.

Accordingly, the outside air introduced from the outside thereof flows into a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

Herein, the second coolant heater 43 may be operated when the temperature of the coolant circulating along the first connection line 41 is lower than the target temperature, to heat the coolant circulating in the first connection line 41.

On the other hand, when the air heater 52c is applied in place of the second coolant heater 43, the air heater 52c may be operated when the temperature of the outside air supplied to the heater 52a is lower than the target temperature, to heat the outside air flowing into the vehicle interior.

That is, the air heater 52c may be selectively operated depending on the temperature of the outside air flowing into the heater 52a.

Accordingly, according to various exemplary embodiments of the present invention, it is possible to recover the waste heat generated in the electrical component 15 while repeating the above-described process, and to use the waste heat for internal heating, reducing power consumption and improving overall heating efficiency.

Meanwhile, in the exemplary embodiment of the present invention, an operation for cooling the electrical component 15 while recovering waste heat from the electrical component 15 in the vehicle heating mode will now be described.

First, in the cooling apparatus 10, the first water pump 14 is operated for circulation of the coolant. In the instant case, the air conditioner 50 is stopped.

Herein, the first connection line 41 is opened by operating the first valve V1, and the second connection line 42 is opened.

Furthermore, the battery coolant line 21 is closed through operation of the second valve V2 except for the battery coolant line 21 connected to the chiller 30.

That is, the battery coolant line 21 connecting the second water pump 22, the battery module 24, and the first coolant heater 26 is closed, and the battery cooling apparatus 20 is deactivated.

Furthermore, a part of the coolant stored in the reservoir tank 16 may be circulated along the coolant line 11 through the opened supply line 17.

Herein, the first valve V1 opens the coolant line 11 connected to the radiator 12 based on the first connection line 41 when the electrical component 15 is overheated.

Furthermore, the coolant line 11 connecting the radiator 12 and the reservoir tank 16 and the coolant line 11 connecting the reservoir tank 16 and the second valve V2 are open.

In the present state, a part of the coolant having the temperature that has risen through the electrical component 15 by operating the first water pump 14 is supplied to the heater 52a along the first connection line 41 without passing through the radiator 12.

The coolant discharged from the heater 52a flows into the chiller 30 along the second connection line 42, and then flows into the coolant line 11 through an opened portion of the battery coolant line 21.

That is, a part of the coolant that has passed through the electrical component 15 continues to circulate along the coolant line 11, the first and second connection lines 41 and 42, and a portion of the battery coolant line 21 without passing through the radiator 12, and absorbs the waste heat from the electrical component 15, so that the temperature thereof increases.

Accordingly, a part of the coolant having the temperature that has been raised is supplied to the heater 52a through the opened first connection line 41 without passing through the radiator 12.

The high-temperature coolant supplied to the heater 52a performs heat exchange with the outside air, and then is introduced into the coolant line 11 through the second connection line 42 and the chiller 30, and a portion of the battery coolant line 21 without passing through the radiator 12.

Herein, the opening and closing door 52b is opened such that the outside air flowing into the HVAC module 52 passes through the heater 52a.

Accordingly, the outside air introduced from the outside thereof flows into a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

Meanwhile, the remaining coolant, which is not supplied to the heater 52a, is cooled through the radiator 12.

The coolant, which has been cooled, may recover the waste heat and efficiently cool the electrical component 15 while passing through the electrical component 15 together with the coolant flowing into the coolant line 11 through a portion of the battery coolant line 21.

When the electrical component 15 is overheated, the first valve V1 may open the coolant line 11 connected to the radiator 12 to allow a part of the coolant passing through the electrical component 15 to flow into the first connection line 41 and the remaining part of the coolant to flow into the radiator 12.

As a result, some coolant cooled in the radiator 12 may be supplied to the electrical component 15, preventing the electrical component 15 from overheating.

Therefore, according to various exemplary embodiments of the present invention, it is possible to recover the waste heat generated in the electrical component 15, and use the waste heat for internal heating, reducing power consumption and improving overall heating efficiency.

At the same time, according to various exemplary embodiments of the present invention, some coolant may be introduced into the radiator 12 through operation control of the first valve V1 configured for distributing the flow, to be cooled, and then to be supplied to the electrical component 15, efficiently cooling the electrical component 15 and ensuring the cooling performance of the electrical component 15.

An operation in a case of recovering the waste heat of the electrical component 15 in a heating and dehumidifying mode of the vehicle will now be described with reference to FIG. 6.

Figure 6:
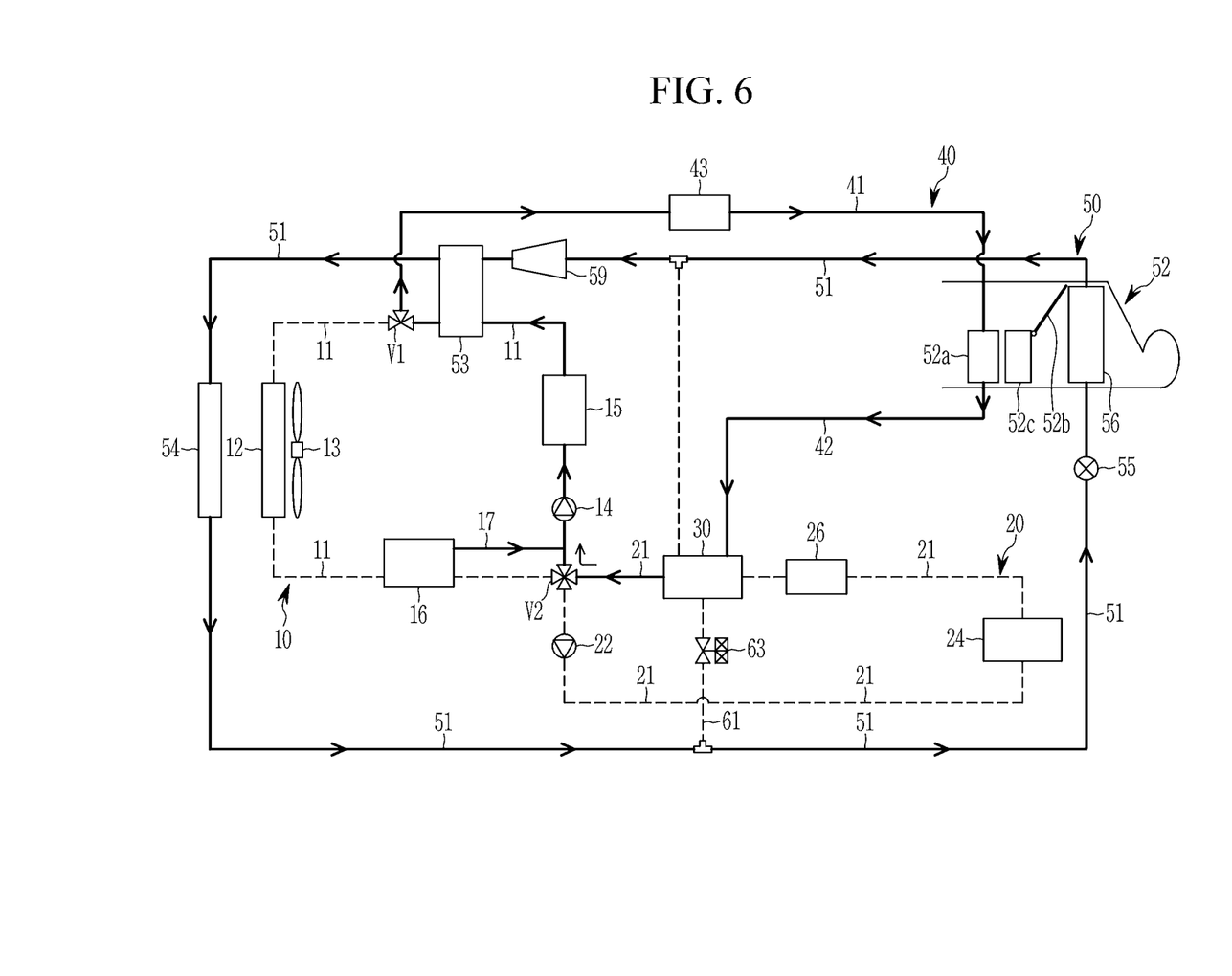
FIG. 6 illustrates an operational state diagram for a heating and dehumidifying mode of a vehicle in a vehicle thermal management system according to various exemplary embodiments of the present invention.

FIG. 6 illustrates an operational state diagram for a heating and dehumidifying mode of a vehicle in a vehicle thermal management system according to various exemplary embodiments of the present invention.

First, in the cooling apparatus 10, the first water pump 14 is operated for circulation of the coolant.

Herein, the first connection line 41 is opened through operation of the first valve V1. At the same time, the second connection line 42 is opened.

Furthermore, on the basis of the first connection line 41, a portion of the coolant line 11 connected to the radiator 12 and a portion of the coolant line 11 connecting the radiator 12 and the reservoir tank 16 are closed.

Herein, the battery coolant line 21 is closed through operation of the second valve V2 except for the battery coolant line 21 connected to the chiller 30.

That is, the battery coolant line 21 connecting the second water pump 22, the battery module 24, and the first coolant heater 26 is closed, and the battery cooling apparatus 20 is deactivated.

Furthermore, a part of the coolant stored in the reservoir tank 16 may be circulated along the coolant line 11 through the opened supply line 17.

In the present state, the coolant having the temperature that has risen through the electrical component 15 by the operation of the first water pump 14 is supplied to the heater 52a along the first connection line 41 without passing through the radiator 12.

The coolant discharged from the heater 52a flows into the chiller 30 along the second connection line 42, and is introduced into the electrical component 15 through the battery coolant line 21 and the coolant line 11 which are opened by operating the second valve V2.

That is, the coolant that has passed through the electrical component 15 continues to circulate along the coolant line 11, the first and second connection lines 41 and 42, and a portion of the battery coolant line 21 without passing through the radiator 12, and absorbs the waste heat from the electrical component 15, so that the temperature thereof increases.

The coolant having the temperature that has been raised is supplied to the heater 52a through the opened first connection line 41 without passing through the radiator 12.

The high-temperature coolant supplied to the heater 52a performs heat exchange with the outside air, and then is introduced into the coolant line 11 through the second connection line 42 and the chiller 30 and a portion of the battery coolant line 21 without passing through the radiator 12.

Herein, the opening and closing door 52b is opened such that the outside air flowing into the HVAC module 52 passes through the heater 52a.

Accordingly, the outside air introduced from the outside thereof may be converted into a high temperature state while passing through the heater 52a, and flows into the vehicle, heating the interior of the vehicle.

Herein, the second coolant heater 43 may be operated when the temperature of the coolant circulating along the first connection line 41 is lower than the target temperature, to heat the coolant circulating in the first connection line 41.

On the other hand, when the air heater 52c is applied in place of the second coolant heater 43, the air heater 52c may be operated when the temperature of the outside air supplied to the heater 52a is lower than the target temperature, to heat the outside air flowing into the vehicle interior.

That is, the air heater 52c may be selectively operated depending on the temperature of the outside air flowing into the heater 52a.

Accordingly, according to various exemplary embodiments of the present invention, it is possible to recover the waste heat generated in the electrical component 15 while repeating the above-described process, and use the waste heat for internal heating, reducing power consumption and improving overall heating efficiency.

Meanwhile, in the air conditioner 50, each constituent element operates to dehumidify the interior of the vehicle.

The condenser 53 condenses the refrigerant by use of the coolant flowing along the coolant line 11. The sub-condenser 54 may further condense the refrigerant introduced from the condenser 53 through heat exchange with the outside air.

Herein, the refrigerant line 51 connecting the sub-condenser 54 and the evaporator 56 is closed by operating the first expansion valve 55. The refrigerant connection line 61 is closed through operation of the second expansion valve 63.

Accordingly, the refrigerant passing through the sub-condenser 54 may be circulated along the refrigerant line 51.

The first expansion valve 55 may expand the refrigerant supplied from the sub-condenser 54 to supply it to the evaporator 56. The refrigerant that has passed through the evaporator 56 is supplied to the compressor 59.

Accordingly, the refrigerant discharged from the compressor 59 may be supplied to the condenser 53.

Herein, the opening and closing door 52b is opened such that the outside air flowing into the HVAC module 52 and passing through the evaporator 56 passes through the heater 52a.

That is, the outside air flowing into the HVAC module 52 is dehumidified while passing through the evaporator 56 by the low-temperature refrigerant flowing into the evaporator 56. In other words, the outside air flowing into the HVAC module 52 is dehumidified by the low-temperature refrigerant flowing into the evaporator 56 while passing through the evaporator 56.

An operation of the case of heating the battery module 26 will now be described with respect to FIG. 7.

Figure 7:
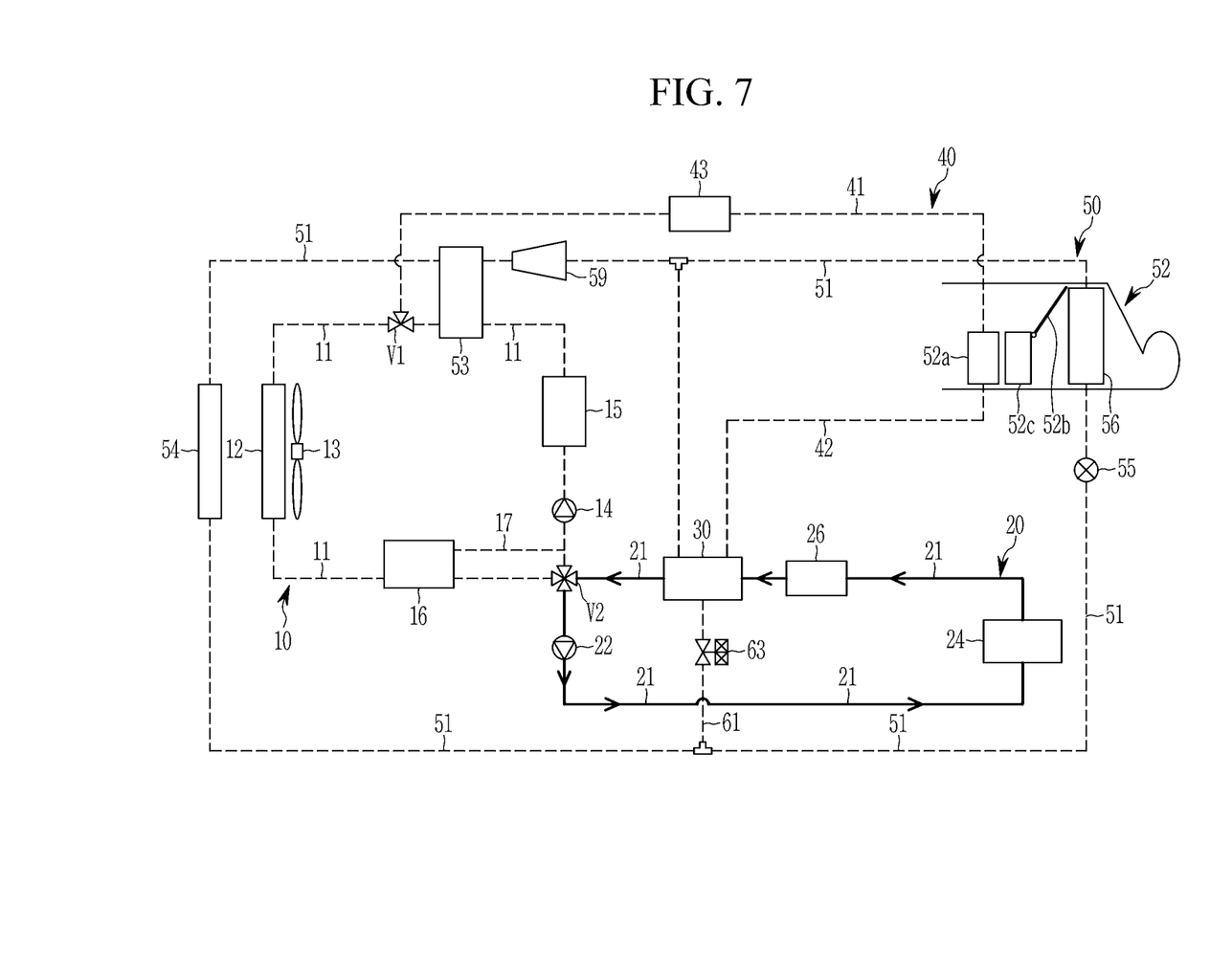
FIG. 7 illustrates an operational state diagram for temperature increase of a battery module in a vehicle thermal management system according to various exemplary embodiments of the present invention.

FIG. 7 illustrates an operational state diagram for temperature increase of a battery module in a vehicle thermal management system according to various exemplary embodiments of the present invention.

Referring to FIG. 7, the cooling apparatus 10, the heating circuit 40, and the air conditioner 50 are stopped.

Herein, the connection between the battery coolant line 21 and the coolant line 11 is closed by the operation of the second valve V2.

That is, in the battery cooling apparatus 20, the battery coolant line 21 connecting the second water pump 22, the battery module 24, and the first coolant heater 26 is opened.

In the present state, the coolant is circulated along the battery coolant line 21 through operation of the second water pump 22.

Herein, the first coolant heater 26 is operated to heat the coolant supplied to the battery module 24 along the opened battery coolant line 21.

Accordingly, the coolant circulating in the battery coolant line 21 rises in temperature as it passes through the first coolant heater 26. Accordingly, the coolant having an increased temperature while passing through the first coolant heater 26 may be supplied to the battery module 24, to raise the temperature of the battery module 24.

As a result, according to various exemplary embodiments of the present invention, it is possible to rapidly increase the temperature of the battery module 24 while repeating the above-described process, efficiently managing the temperature of the battery module 24.

Therefore, as described above, according to the vehicle thermal management system according to the exemplary embodiment of the present invention, the temperature of the battery module 24 may be adjusted depending on the mode of the vehicle by use of one chiller 30 for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component 15 and using it for internal heating.

Furthermore, according to various exemplary embodiments of the present invention, it is possible to optimize the performance of the battery module 24 by efficiently controlling the temperature of the battery module 24, and to increase an overall travel distance of the vehicle through efficient management of the battery module 24.

Furthermore, the entire system may be simplified to reduce manufacturing cost and weight, and to improve space utilization.

In an exemplary embodiment of the present invention, a controller is connected to at least one of the elements of the vehicle thermal management system to control the operations thereof.

In addition, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a controller, and the controller may be configured by multiple controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
    a cooling apparatus including: a radiator, a first water pump, a first valve, and a reservoir tank which are connected through a coolant line, and to circulate a coolant in the coolant line to cool at least one electrical component provided in the coolant line;
    a battery cooling apparatus including a battery coolant line connected to the coolant line through a second valve, and a second water pump and a battery module which are connected through the battery coolant line to circulate the coolant in the battery module;
    a chiller provided in the battery coolant line between the second valve and the battery module, and connected to a refrigerant line of an air conditioner through a refrigerant connection line, to adjust a temperature of the coolant by heat-exchanging the coolant supplied to the battery coolant line with a refrigerant selectively supplied from the air conditioner through the refrigerant connection line; and
    a heating circuit including a heater which is connected to the coolant line and the chiller through first and second connection lines to supply a coolant having a temperature which is increased while passing through the at least one electrical component,
    wherein the reservoir tank is provided in the coolant line between the radiator and the second valve, and is connected to the coolant line connecting the second valve and the first water pump through a supply line.

2. The thermal management system of claim 1, wherein the supply line is connected to a portion of the reservoir tank and aligned to bypass the second valve.

3. The thermal management system of claim 1,
    wherein a first end portion of the first connection line is connected to the coolant line through the first valve, and a second end portion of the first connection line is connected to the heater,
    wherein a first end portion of the second connection line is connected to the heater, and a second end portion of the second connection line is connected to the chiller, and
    wherein the heater is provided inside a heating, ventilation, and air conditioning (HVAC) module included in the air conditioner.

4. The thermal management system of claim 1, wherein the battery cooling apparatus further includes a first coolant heater provided in the battery coolant line between the battery module and the chiller.

5. The thermal management system of claim 4, wherein when the battery module is heated,
    the battery coolant line is closed in connection with the coolant line by operating the second valve,
    the coolant is circulated along the battery coolant line by operating the second water pump, and
    the first coolant heater is operated to heat a coolant supplied to the battery module along the battery coolant line.

6. The thermal management system of claim 1, wherein the air conditioner includes:
    an HVAC module including an evaporator which is connected thereto through the refrigerant line and a door configured to control outside air passing through the evaporator to be selectively introduced into the heater depending on cooling, heating, and heating/dehumidifying modes of the vehicle therein;
    a condenser connected to the coolant line to circulate a coolant therein to perform heat exchange between the coolant and a refrigerant supplied through the refrigerant line connected to the condenser;
    a compressor connected between the evaporator and the condenser through the refrigerant line;
    a sub-condenser provided in the refrigerant line between the condenser and the evaporator;
    a first expansion valve provided in the refrigerant line between the sub-condenser and the evaporator; and
    a second expansion valve provided in the refrigerant connection line.

7. The thermal management system of claim 6,
    wherein a first end portion of the refrigerant connection line is connected to the refrigerant line between the sub-condenser and the first expansion valve, and
    wherein a second end portion of the refrigerant connection line is connected to the refrigerant line between the evaporator and the compressor.

8. The thermal management system of claim 6, wherein each of the chiller and the condenser is a water-cooled heat exchanger, and the sub-condenser is an air-cooled heat exchanger.

9. The thermal management system of claim 6, wherein the HVAC module further includes an air heater provided between the heater and the evaporator to selectively heat outside air flowing into the heater.

10. The thermal management system of claim 9, wherein the air heater is operated to raise a temperature of the outside air flowing into the heater when a temperature of a coolant supplied to the heater is lower than a target temperature for internal heating.

11. The thermal management system of claim 6, wherein when the battery module is cooled by use of the refrigerant,
    in the cooling apparatus, the coolant is circulated in the coolant line by operating the first water pump, and the supply line is opened, and
    the first connection line and the second connection line are closed through operation of the first valve, and
    in the battery cooling apparatus, the coolant is circulated in the battery coolant line by operating the second water pump, and
    each of the cooling apparatus and the battery cooling apparatus form an independent closed and sealed circuit in which the coolant is circulated by operating the second valve, while
    in the air conditioner, the refrigerant connection line is opened through operation of the second expansion valve, and
    the second expansion valve expands the refrigerant supplied to the refrigerant connection line and supplies the expanded refrigerant to the chiller.

12. The thermal management system of claim 6, wherein
when waste heat is recovered from the at least one electrical component in the vehicle heating and dehumidifying mode,
the first connection line and the second connection line are opened through operation of the first valve, and
in the cooling apparatus, a portion of the coolant line connected to the radiator and a portion of the coolant line connecting the radiator and the reservoir tank are closed based on the first connection line,
a battery coolant line other than a portion of the battery coolant line connected to the chiller is closed through operation of the second valve,
the coolant having a temperature that has risen through the at least one electrical component by operating the first water pump is supplied to the heater along the first connection line without passing through the radiator,
the coolant exhausted from the heater flows into the chiller along the second connection line, and flows into the at least one electrical component through the battery coolant line and the coolant line which are opened by operating the second valve,
a part of the coolant stored in the reservoir tank is circulated along the opened coolant line through the opened supply line, while
in the air conditioner, the refrigerant connection line is closed by operating of the second expansion valve, and the refrigerant is circulated along the refrigerant line by operating the compressor.

13. The thermal management system of claim 1, wherein
when the at least one electrical component and the battery module are cooled by use of a coolant cooled in the radiator,
the first and second connection lines are closed through operation of the first valve,
the battery coolant line is connected to the coolant line by operating the second valve,
the coolant cooled by the radiator and stored in the reservoir tank is supplied to the battery module while circulating along the battery coolant line by operating the second valve and the second water pump,
the coolant circulating through the battery cooling apparatus is supplied to the at least one electrical component while circulating along the coolant line by operating the first water pump, and
a part of the coolant stored in the reservoir tank is circulated along the coolant line through the opened supply line.

14. The thermal management system of claim 1, wherein
when waste heat is recovered from the at least one electrical component in a vehicle dehumidifying mode,
the first connection line and the second connection line are opened through operation of the first valve,
a portion of the coolant line connected to the radiator and a portion of the coolant line connecting the radiator and the reservoir tank are closed based on the first connection line in the cooling apparatus,
the battery coolant line other than a portion of the battery coolant line connected to the chiller is closed through operation of the second valve,
the coolant having a temperature that has risen through the at least one electrical component by operating the first water pump is supplied to the heater along the first connection line without passing through the radiator,
the coolant exhausted from the heater flows into the chiller along the second connection line, and flows into the at least one electrical component through the battery coolant line and the coolant line which are opened by operating the second valve, and
a part of the coolant stored in the reservoir tank is circulated along the opened coolant line through the opened supply line.

15. The thermal management system of claim 14, wherein the first valve is configured to open the coolant line connected to the radiator to allow a part of the coolant passing through the at least one electrical component to flow into the first connection line and a remaining part of the coolant to flow into the radiator when the at least one electrical component is overheated.

16. The thermal management system of claim 1, wherein the first valve is a three-way valve configured for distributing a flow rate, and the second valve is a four-way valve.

17. The thermal management system of claim 1, wherein the electrode component includes an electric power control unit (EPCU), a motor, an inverter, or an on board charger (OBC).

18. The thermal management system of claim 1, wherein the supply line is connected to the coolant line when the coolant is circulated to the coolant line by operating the first water pump.

19. The thermal management system of claim 1, wherein the heating circuit further includes a second coolant heater provided in the first connection line.

20. The thermal management system of claim 19, wherein the second coolant heater is operated to raise a temperature of an outside air flowing into the heater when a temperature of a coolant supplied to the heater through the first connection line is lower than a target temperature for internal heating.

* * * * *